United States Patent [19]

Schucker

[11] Patent Number: 4,666,732
[45] Date of Patent: May 19, 1987

[54] PROCESS FOR THE CONTROL AND ADJUSTMENT OF THE FLOW OF A VISCOUS LIQUID IN AN APPARATUS WHICH AUTOMATICALLY EMITS THE VISCOUS LIQUID IN THE FORM OF A SEAM

[75] Inventor: Josef Schucker, Kaichen, Fed. Rep. of Germany

[73] Assignee: ASEA GmbH, Bad Honnef, Fed. Rep. of Germany

[21] Appl. No.: 832,434

[22] Filed: Feb. 24, 1986

[30] Foreign Application Priority Data

Feb. 22, 1985 [DE] Fed. Rep. of Germany ....... 3506110

[51] Int. Cl.$^4$ .............................................. B05D 1/26
[52] U.S. Cl. ......................................... 427/8; 118/663; 118/712; 427/10; 427/256; 427/286
[58] Field of Search ..................... 427/10, 8, 256, 286; 118/663, 712

[56] References Cited

U.S. PATENT DOCUMENTS

| | | | |
|---|---|---|---|
| 1,987,197 | 1/1935 | Krueger et al. | 118/712 |
| 4,251,566 | 2/1981 | Gingerich | 427/10 |
| 4,367,244 | 1/1983 | Holmes | 427/10 |
| 4,417,934 | 11/1983 | Vaugham | 427/10 |

*Primary Examiner*—Norman Morgenstern
*Assistant Examiner*—Janyce A. Bell
*Attorney, Agent, or Firm*—Watson, Cole, Grindle & Watson

[57] ABSTRACT

A process for the regulation or control of the flow of a viscous liquid, such as an adhesive or plastic substance, which is applied as seam (1) on a workpiece (2) by an applicator device (3) guided by a robot, whereby the viscous liquid of the applicator device is continuously supplied from a cylinder (7) in which a piston (9), shiftable by a drive mechanism (1) exerts a constant pressure on the liquid. According to the process, the path ($x_i$) is measured which is passed by the piston (9) during the time in which the robot passes through a certain track section (n). The measured value ($x_i$) for the piston path is compared to a set value ($x_s$) for the piston path and the difference ($x_s - x_i$) is added during the subsequent passing of the same track section during the next work cycle, as a correction set value (K) algebraically to a basic set value ($f_{sg}$) for a regulation or control of the nozzle opening of the applicator device (3). In this manner the influence of viscosity changes and deterioration of the nozzle opening of the thickness of the applied seam are eliminated.

3 Claims, 1 Drawing Figure

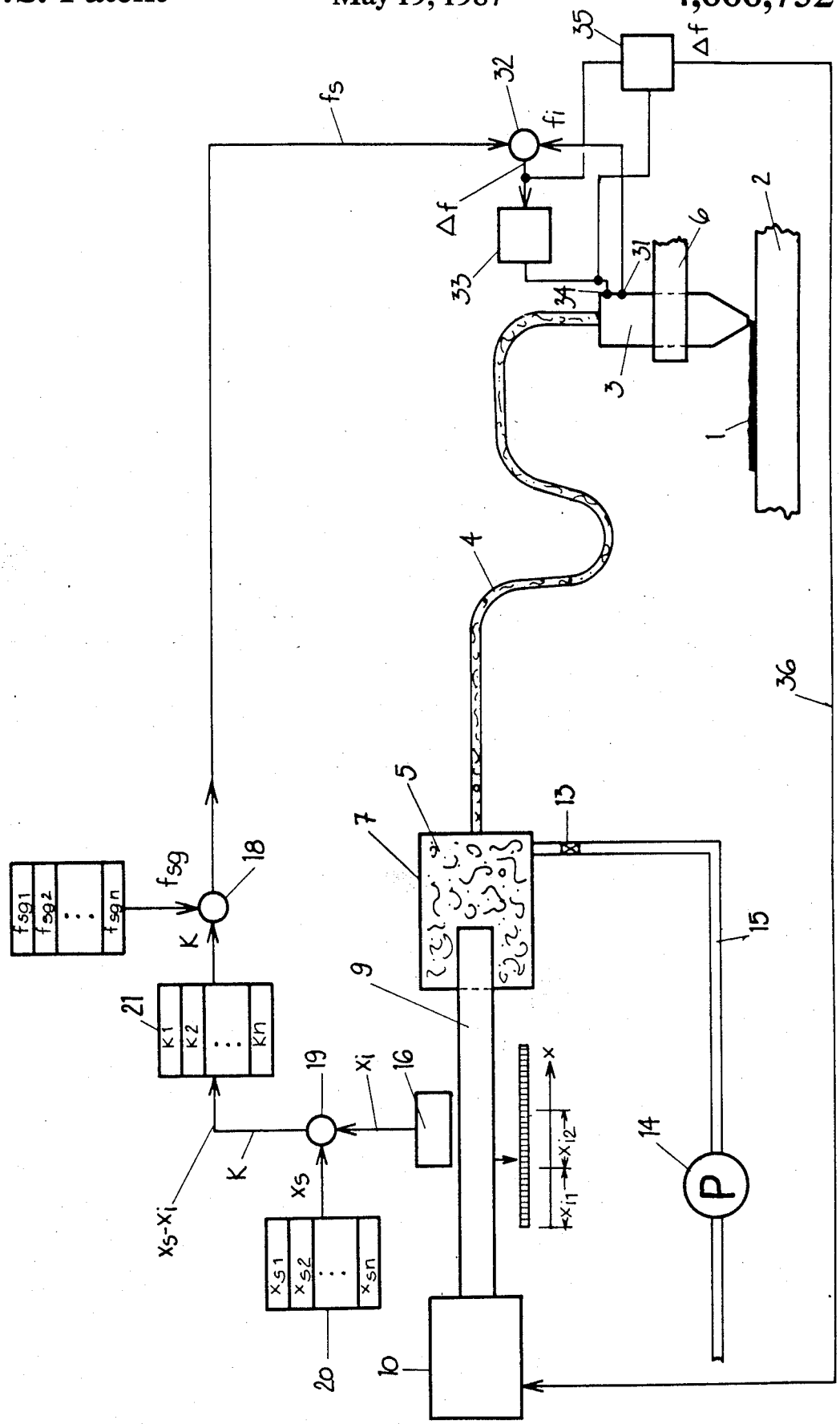

PROCESS FOR THE CONTROL AND ADJUSTMENT OF THE FLOW OF A VISCOUS LIQUID IN AN APPARATUS WHICH AUTOMATICALLY EMITS THE VISCOUS LIQUID IN THE FORM OF A SEAM

BACKGROUND OF THE INVENTION

1. FIELD OF THE INVENTION

The present invention relates to a process for the control and adjustment of the flow of a viscous liquid in an apparatus which includes an applicator device.

2. THE PRIOR ART

In industry, automatic machines such as robots are used, among other things, for the automatic application of a seam of viscous liquid onto given tracks. The viscous liquid can be, for example, an adhesive, a sealing compound or a plastic substance. A specific example is the application by a controlled robot of an adhesive along a given track on a workpiece. This process occurs, for example, in the automobile industry for the application of an adhesive or a sealing compound on the inside of the outer sheet metal section of car doors, to which then the inner sheet metal section of the door is glued.

This technique requires that the applied seam have a desired thickness, i.e., that a desired amount of the viscous liquid is applied per unit length of the track. The amount sprayed or applied during a certain time unit is called the flow. Thus, the flow coming out of the applicator device has to be at a certain ratio to the frequent changes, during one operational cycle, of the track speed of the robot.

To execute the above process it is known to supply the applicator device, which is guided by the robot arm, with the viscous liquid through a flexible hose, the hose being connected to a cylinder filled with the viscous liquid, a piston in the cylinder expressing the liquid from the cylinder by applying a constant force thereto. The flow of the liquid can be changed by adjusting this force. However, in this known process the flow of the liquid can deviate from the set value because of varying viscosity, resulting from changes in the temperature, and from deterioration (obstruction) of the nozzle opening of the applicator device.

In order to adjust the thickness of the liquid seam, it is also known to construct the drive for the piston in the noted cylinder in such a manner that the piston operates independently of the resistance to be overcome and at an adjustable constant speed. In this process, the applicator device works with a constant nozzle opening. However, there is no means for checking that the applied amount per time unit conforms to the set value. A change is only possible by adjusting the speed of the piston, and this adjustment is subjected to a large time constant. When changing from one phase to the next within an operational cycle the speed and/or the amount of the viscous liquid to be applied per unit length is changed, so that at that time the flow of liquid has to be adjusted. At this point the high viscosity and thus inertia of the adhesive proves to be a disadvantage. For the transition from one to the next track section there is only a relatively short amount of time available, and within this time the required flow change has to be made. In addition, the pressure changes appear unfavorably in the viscous liquid, on the one hand, because the viscous liquid has a significant compressibility, and, on the other hand, because the supply hoses expand during high operational pressures of between 100 and 200 bar and shrink when the pressure is lowered. This results in variations in the amount of viscous liquid applied per unit length in the form of transient processes. Though it would be possible to largely eliminate the last noted effect by installing the piston cylinder arrangement on the robot hand, the weight of the robot arm, designed for rapid motions, would increase considerably, and this would result in a disadvantageous influence on the applicator speed.

SUMMARY OF THE INVENTION

The present invention is directed to providing a process of the noted type in which the flow of liquid coming from the applicator device is independent of the viscosity of the liquid and the deterioration of the nozzle, and in which the applicator device very quickly responds to a change of the track speed or the amount of liquid to be applied per length unit of the track.

According to the invention, the path ($x_i$) passed by the piston during the time that the robot passes a certain track segment (n), constituting a measurement for the amount of flow, is measured, that the measured value ($x_i$) for the piston path is compared to a set value ($x_s$) for the piston path and that the difference ($x_s - x_i$) is stored, and during the passage through the track segment (n) during the subsequent work cycle this value is algebraically added as a correction value (K) to a basic set value ($f_{sg}$) for regulation or control of the nozzle opening of the applicator device.

The invention will be better understood by reference to the attached figure, taken in conjunction with the following discussion. The figure shows a schematic diagram of an apparatus which works according to the method of the invention.

Designated by 6 is the arm of a robot (not otherwise shown) on the free end of which is clamped an applicator device 3, e.g., a spray gun. The robot guides the applicator device 3 at a certain speed along a track near the surface of a workpiece 2 to enable an adhesive seam to be applied thereto. The applicator device 3 is connected through a flexible hose 4 to a cylinder 7, in which there is hot or cold adhesive, which is filled in at the beginning of a work cycle with the aid of a pump 14 through a pipe 15 and a valve 13. In the cylinder 7 a piston 9 is arranged, the drive 10 of which is designed in such a manner that it shifts the piston towards the adhesive at an adjustable constant pressure.

The track passed by the robot is divided into individual track sections, these track sections being either straight or bent sections. The time needed for passing one track section is called a phase. The passage through the whole track constitutes one work cycle. At the end of the track sections there often is a change in direction. As a rule, the robot runs the track at its maximum possible speed. Usually, this is slower for bent track sections than for straight ones.

The applicator device has a nozzle opening on which the average cross section can be adjusted by means of an adjustment device (not shown). This adjustment regulates the liquid flow. The adjustment is done, for example, by means of turning or translational shifting of a piston rod, and by determining the position of this piston rod, the value is obtained for the size of the nozzle opening which is used as given value $f_i$ for the flow. In the figure, the device for making this determination is indicated symbolically in position 31. In a comparison device 32, the given flow $f_i$ is compared to a set value $f_s$ and the deviation from the norm $\Delta f$ sent to an adjuster 33, which controls an adjustment device in the applicator device, symbolically indicated by 34.

The set value $f_s$ for the flow is composed of a basic set value $f_{sg}$ and a correction set value K, which, in the adding device 18, is algebraically added to the basic set value. The basic set value is based on a certain viscosity of the liquid and a certain relationship between the nozzle opening and the adjustment device 34 for the nozzle opening of the applicator device. The correction set value K is supposed to register and compensate for changes in viscosity as well as wear related changes in the nozzle opening at a given position of the adjustment device. For this purpose, a symbolically shown path-measuring system 16 is used to measure the partial paths $x_i$ which the piston 9 passes when running the individual phases of a robot work cycle. These values $x_i$ are deducted in an adding device 19 from the corresponding set values for the amount of the viscous liquid applied per phase. These set values come from a set value provider 20 which is symbolically indicated in the figure for one work cycle of n phases. The difference between $x_s - x_i$ for the individual phases are the correction values for the set value. They are stored in a memory 21 during the currently running work cycle. During the subsequent work cycle, the correction values gathered in the preceding work cycle are algebraically added to the basic set value $f_{sg}$. This basic set value also can basically have different values for the individual phases of the work cycle, which is the case, for example, when during the transfer from one phase to the next, the track speed changes, but the seam thickness to be applied is supposed to remain constant.

When the adjustment device 34 reaches the top limit of its adjustment range (maximum opening of the nozzle) without the actual flow reaching the set flow value, the pressure exerted by the drive mechanism 10 onto the piston 9 can be increased. For this purpose it is suitable that the signal $\Delta f$ is made to affect the drive 10 of the piston through the signal line 36.

As was stated above, the adjustment of the nozzle opening is also necessary, for example, when the thickness of the seam is supposed to be changed during the transition from one track section (phase) to the next track section. The time available for this adjustment is extremely short as the resting time of the robot during this transition is very short. It is, for example, approximately 20 ms. In order to assure the thus necessary rapid adjustment of the nozzle opening, the adjustment of the nozzle opening can be executed by means of an electric drive, operated on direct current, whereby a voltage surge is used for a short time.

The process according to the invention is also applicable when the flow of the liquid is not regulated but only controlled, i.e., no registration of the actual value $f_i$ takes place.

I claim:

1. A process for the regulation or control of the flow of a viscous liquid which, during one work cycle is applied by an applicator device, guided by a robot, as a seam onto a workpiece, whereby the viscous liquid is continuously supplied to the applicator device from a cylinder in which a piston, shiftable by means of a drive mechanism, exerts a constant pressure onto the liquid, wherein the path ($x_i$) passed by the piston during the time that the robot passes a certain track segment (n), constituting a measurement for the amount of flow, is measured, that the measured value ($x_i$) for the piston path is compared to a set value ($x_s$) for the piston path and that the difference ($x_s - x_i$) is stored and during the passage through the track segment (n) during the subsequent work cycle is algebraically added as correction value (K) to a basic set value ($f_{sg}$) for a regulation or control of the nozzle opening of the applicator device.

2. A process according to claim 1, wherein the adjustment of the nozzle opening of the applicator device is done by means of an electrical drive.

3. A process according to claim 1, wherein at the maximum opening of the exit nozzle of the applicator device the pressure exerted on the piston of the piston-cylinder arrangement is adjusted in dependence on the set value or the deviation from the norm for the flow.

* * * * *